(12) United States Patent
Chui et al.

(10) Patent No.: US 12,737,969 B2
(45) Date of Patent: Sep. 15, 2026

(54) INTERACTIVE IMAGE GENERATION

(71) Applicant: Outward, Inc., San Jose, CA (US)

(72) Inventors: Clarence Chui, Los Altos Hills, CA (US); Manu Parmar, Sunnyvale, CA (US); Marc Mignard, Los Gatos, CA (US); Avinash Venkata Uppuluri, Sunnyvale, CA (US); John Le, Santa Clara, CA (US); Andrew Pang, Fremont, CA (US)

(73) Assignee: Outward, Inc., San Jose, CA (US)

( * ) Notice: Subject to any disclaimer, the term of this patent is extended or adjusted under 35 U.S.C. 154(b) by 0 days.

(21) Appl. No.: 18/752,598

(22) Filed: Jun. 24, 2024

(65) Prior Publication Data

US 2024/0346748 A1 Oct. 17, 2024

Related U.S. Application Data

(63) Continuation of application No. 17/966,246, filed on Oct. 14, 2022, now Pat. No. 12,056,812.

(Continued)

(51) Int. Cl.
*G06T 15/50* (2011.01)
*G06T 7/10* (2017.01)

(Continued)

(52) U.S. Cl.
CPC .............. *G06T 15/506* (2013.01); *G06T 7/10* (2017.01); *G06T 7/50* (2017.01); *G06T 7/70* (2017.01);

(Continued)

(58) Field of Classification Search
CPC ........... G06T 15/506; G06T 7/10; G06T 7/50; G06T 7/70; G06T 15/04; G06T 15/50; G06T 15/60; G06T 17/20; G06T 19/006; G06T 19/20; G06T 2200/08; G06T 2200/24; G06T 2207/10028; G06T 2207/20081; G06T 2207/20084;

(Continued)

(56) References Cited

U.S. PATENT DOCUMENTS

| | | |
|---|---|---|
| 6,034,739 A | 3/2000 | Rohlfing |
| 7,420,555 B1 | 9/2008 | Lee |

(Continued)

OTHER PUBLICATIONS

Nguyen et al., A Robust 3D-2D Interactive Tool for Scene Segmentation and Annotation, IEEE Transactions on Visualization and Computer Graphics, vol. 24, No. 12, Dec. 2018, pp. 3005-3018.

(Continued)

*Primary Examiner* — Yogesh K Aggarwal
(74) *Attorney, Agent, or Firm* — Van Pelt, Yi & James LLP

(57) ABSTRACT

A content generation platform is generally described herein. More specifically, interactive image generation and techniques and features thereof are disclosed herein. One or more sets of images of a scene are captured in an imaging studio. The captured one or more sets of images of the scene are processed using one or more machine learning based networks to generate an interactive image of the scene comprising a plurality of interactive features. One or more of the plurality of interactive features of the generated interactive image may be modified or edited according to user preferences.

54 Claims, 10 Drawing Sheets

Related U.S. Application Data

(60) Provisional application No. 63/255,886, filed on Oct. 14, 2021.

(51) Int. Cl.

*G06T 7/50* (2017.01)
*G06T 7/70* (2017.01)
*G06T 15/04* (2011.01)
*G06T 15/60* (2006.01)
*G06T 17/20* (2006.01)
*G06T 19/00* (2011.01)
*G06T 19/20* (2011.01)
*G06V 10/70* (2022.01)
*G06V 20/00* (2022.01)
*G06V 20/20* (2022.01)
*H04N 5/222* (2006.01)
*H04N 23/56* (2023.01)
*H04N 23/74* (2023.01)
*H04N 13/239* (2018.01)

(52) U.S. Cl.

CPC .............. *G06T 15/04* (2013.01); *G06T 15/50* (2013.01); *G06T 15/60* (2013.01); *G06T 17/20* (2013.01); *G06T 19/006* (2013.01); *G06T 19/20* (2013.01); *G06V 10/70* (2022.01); *G06V 20/20* (2022.01); *G06V 20/36* (2022.01); *H04N 5/222* (2013.01); *H04N 23/56* (2023.01); *H04N 23/74* (2023.01); *G06T 2200/08* (2013.01); *G06T 2200/24* (2013.01); *G06T 2207/10028* (2013.01); *G06T 2207/20081* (2013.01); *G06T 2207/20084* (2013.01); *G06T 2207/20212* (2013.01); *G06T 2207/30244* (2013.01); *G06T 2210/04* (2013.01); *G06T 2210/56* (2013.01); *G06T 2219/2004* (2013.01); *G06T 2219/2016* (2013.01); *H04N 13/239* (2018.05)

(58) Field of Classification Search

CPC . G06T 2207/20212; G06T 2207/30244; G06T 2210/04; G06T 2210/56; G06T 2219/2004; G06T 2219/2016; G06V 10/70; G06V 20/20; G06V 20/36; G06V 10/141; G06V 10/82; H04N 23/74; H04N 5/222; H04N 23/61; H04N 23/617; H04N 23/62; H04N 5/2228

See application file for complete search history.

(56) References Cited

U.S. PATENT DOCUMENTS 8,010,906 B1 8/2011 Sinnard
8,301,022 B1 * 10/2012 McGuire ................ G03B 15/06 396/3
9,495,796 B2 11/2016 Breton
9,536,340 B2 1/2017 Loberg
9,552,674 B1 1/2017 Jayadevaprakash
9,619,931 B1 4/2017 Klabunde
9,990,760 B2 6/2018 Aguilera Perez
10,109,107 B2 10/2018 Knorr
10,127,727 B1 11/2018 Yuan
10,168,789 B1 1/2019 Soto
10,210,664 B1 2/2019 Chaturvedi
10,373,380 B2 8/2019 Kutliroff
10,692,277 B1 6/2020 Sunkavalli
10,699,488 B1 6/2020 Terrano
10,885,701 B1 1/2021 Patel
11,200,718 B1 12/2021 Meyer
11,375,179 B1 6/2022 Clemens
11,496,691 B2 11/2022 Chapman
11,666,825 B2 6/2023 Delamont
11,856,674 B1 12/2023 Sanchez
11,864,285 B2 1/2024 Beaumier
11,935,199 B2 3/2024 Faaborg
11,983,853 B1 * 5/2024 Zhu ........................... G06T 5/70
2001/0032062 A1 10/2001 Plaskoff
2003/0038875 A1 2/2003 Ivanov
2003/0174286 A1 9/2003 Trumbull
2004/0095474 A1 5/2004 Matsufune
2005/0104966 A1 5/2005 Schoelkopf
2007/0057815 A1 3/2007 Foy
2007/0133880 A1 6/2007 Sun
2010/0158379 A1 6/2010 Hatfield
2011/0242334 A1 10/2011 Wilburn
2012/0002871 A1 1/2012 Hu
2013/0218714 A1 8/2013 Watkins
2013/0272609 A1 10/2013 Sun
2014/0129990 A1 5/2014 Xin
2014/0368530 A1 12/2014 James
2015/0062125 A1 3/2015 Aguilera Perez
2015/0130790 A1 5/2015 Vasquez, II
2015/0250041 A1 9/2015 Jobe
2015/0302116 A1 10/2015 Howell
2016/0180419 A1 6/2016 Adeyoola
2016/0180441 A1 * 6/2016 Hasan .................. G06F 3/0482 705/26.7
2016/0260260 A1 9/2016 Fei
2017/0064214 A1 3/2017 Zhang
2017/0103584 A1 4/2017 Vats
2018/0189974 A1 7/2018 Clark
2018/0255290 A1 9/2018 Holzer
2019/0043243 A1 2/2019 Chui
2019/0102949 A1 4/2019 Sheftel
2019/0121522 A1 4/2019 Davis
2019/0227172 A1 7/2019 Schaefer
2019/0227419 A1 7/2019 Mcnelley
2019/0318542 A1 10/2019 Sai Krishna
2019/0332866 A1 10/2019 Beall
2020/0005448 A1 1/2020 Subramanian
2020/0098122 A1 3/2020 Dal Mutto
2020/0134383 A1 4/2020 Rhee
2020/0175759 A1 6/2020 Russell
2020/0250879 A1 8/2020 Foster
2020/0279364 A1 9/2020 Sarkisian
2020/0302681 A1 9/2020 Totty
2020/0302686 A1 9/2020 Totty
2020/0312042 A1 10/2020 Sardari
2020/0342652 A1 10/2020 Rowell
2020/0394849 A1 12/2020 Barker
2020/0410725 A1 12/2020 Haines
2021/0012561 A1 1/2021 Sunkavalli
2021/0042950 A1 2/2021 Wantland
2021/0049811 A1 2/2021 Fedyukov
2021/0142497 A1 5/2021 Pugh
2021/0174604 A1 6/2021 Long
2021/0183080 A1 6/2021 Hoiem
2021/0201526 A1 7/2021 Moloney
2021/0224889 A1 7/2021 Colby
2021/0241478 A1 8/2021 Putman
2021/0279957 A1 9/2021 Eder
2021/0327119 A1 10/2021 Malin
2021/0350634 A1 11/2021 Major
2021/0383115 A1 12/2021 Alon
2021/0407169 A1 12/2021 Swann
2022/0005099 A1 1/2022 Mordovskoi
2022/0028159 A1 1/2022 Vincent
2022/0084296 A1 3/2022 Sadalgi
2022/0101507 A1 3/2022 Tournier
2022/0101556 A1 * 3/2022 Zhang .................... G06V 20/52
2022/0114291 A1 4/2022 Li
2022/0165023 A1 5/2022 Lino
2022/0269888 A1 8/2022 Stoeva
2022/0284551 A1 9/2022 Neofytou
2022/0327886 A1 10/2022 Mathur
2022/0343591 A1 10/2022 Jutan
2022/0366263 A1 11/2022 Ji
2023/0022108 A1 1/2023 Ghosh
2023/0079580 A1 3/2023 Russell
2023/0085518 A1 3/2023 Chen
2023/0093087 A1 3/2023 Babinowich

(56) References Cited

U.S. PATENT DOCUMENTS

| | | | |
|---|---|---|---|
| 2023/0102949 | A1 | 3/2023 | Boyle |
| 2023/0104172 | A1 | 4/2023 | Kikuchi |
| 2023/0134130 | A1 | 5/2023 | Robert |
| 2023/0154395 | A1 | 5/2023 | Mcnelley |
| 2023/0260236 | A1 | 8/2023 | Rump |
| 2024/0037769 | A1 | 2/2024 | Atwood |
| 2024/0090795 | A1 | 3/2024 | Heng |

OTHER PUBLICATIONS

Chen et al., Deep Learning Approach to Point Cloud Scene Understanding for Automated Scan to 3D Reconstruction, Journal of Computing in Civil Engineering, vol. 33, Issue 4, May 2019, 19 pages.

Havran et al., Interactive System for Dynamic Scene Lighting using Captured Video Environment Maps, Eurographics Symposium on Rendering, 2005, 14 pages.

Zou et al., LayoutNet: Reconstructing the 3D Room Layout from a Single RGB Image, Proceedings of the IEEE Conference on Computer Vision and Pattern Recognition, 2018, pp. 2051-2059.

Sadalgi et al., U.S. Appl. No. 63/079,429 of PG Pub No. 2022/0084296 A1, filed Sep. 16, 2020.

Yang et al., "3D Object Relighting Based on Multi-View Stereo and Image Based Lighting Techniques" 2009 IEEE International Conference on Multimedia and Expo, IEEE, 2009.

* cited by examiner

INTERACTIVE IMAGE GENERATION

CROSS REFERENCE TO OTHER APPLICATIONS

This application is a continuation of U.S. patent application Ser. No. 17/966,246, now U.S. Pat. No. 12,056,812, entitled INTERACTIVE IMAGE GENERATION filed Oct. 14, 2022, which claims priority to U.S. Provisional Patent Application No. 63/255,886 entitled INTERACTIVE IMAGE GENERATION filed Oct. 14, 2021, both of which are incorporated herein by reference for all purposes.

BACKGROUND OF THE INVENTION

Providing interactive features with respect to an image has typically required an underlying three-dimensional model or specification of the object or scene comprising the image. Existing techniques for generating a complete three-dimensional model or specification are resource intensive and prohibitive for many applications. Thus, more efficient interactive image generation techniques are needed.

BRIEF DESCRIPTION OF THE DRAWINGS

Various embodiments of the invention are disclosed in the following detailed description and the accompanying drawings.

DETAILED DESCRIPTION

Figure 1:
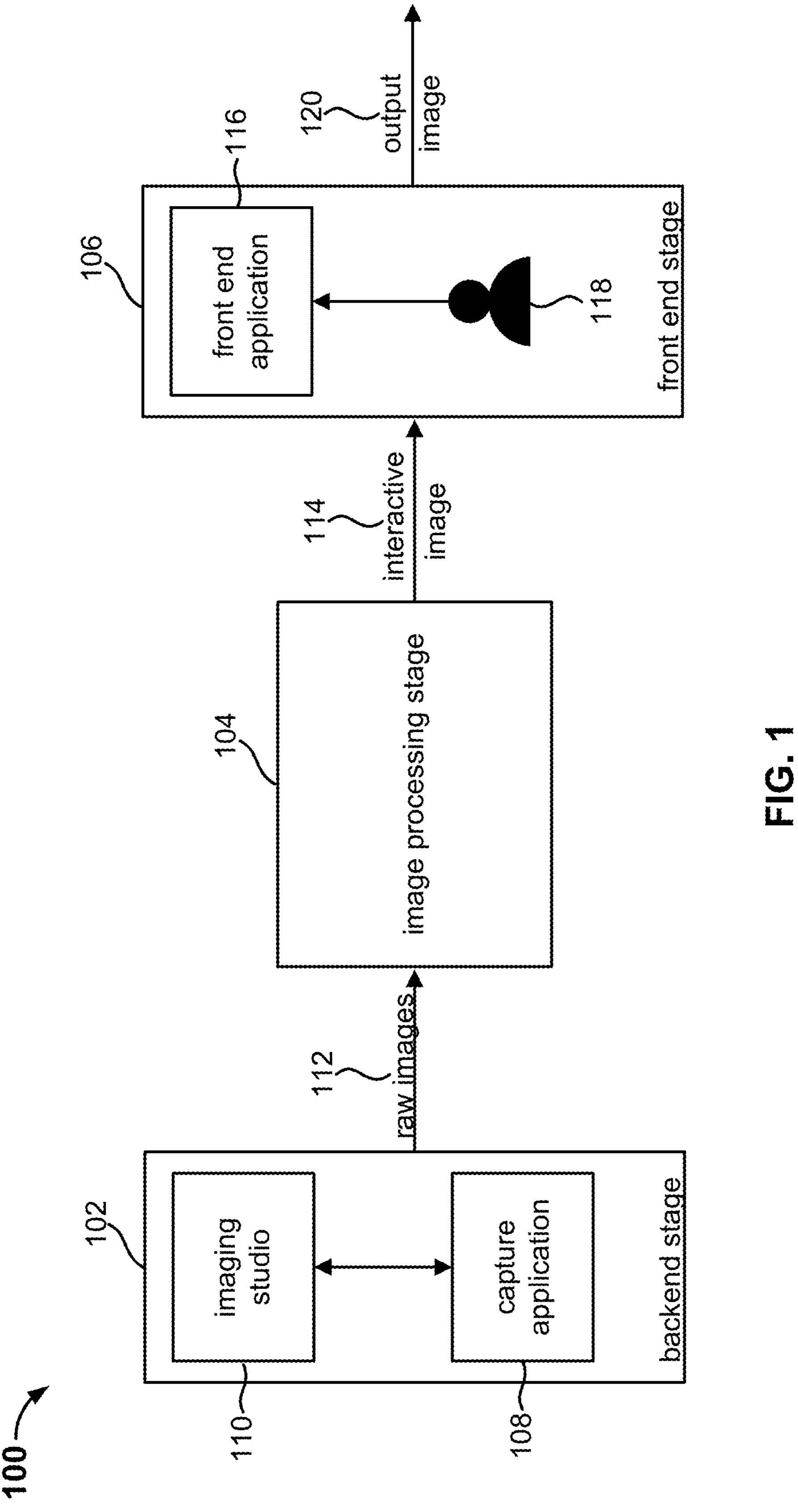
FIG. 1 is a high level block diagram illustrating an embodiment of the disclosed content generation platform.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

A novel content generation platform is disclosed. The disclosed content generation platform facilitates unprecedented merging of actually captured content (reality) that is captured with one or more imaging devices (e.g., cameras or scanners) with computer generated content (virtual reality) that is algorithmically generated via one or more computing resources (e.g., neural networks) such that the resulting output content that is created or generated comprises many (modifiable, customizable, user configurable, interactive) virtual features. Many of the given examples are described with respect to generating interactive imagery. The disclosed image generation techniques, however, may generally be employed with respect to generating any type of image-based content, such as, for example, still images, frames of a video or motion picture or animation, views comprising a three-dimensional space such as a rich augmented reality (AR) or virtual reality (VR) environment, etc. In many embodiments, the generated imagery is photorealistic, i.e., indistinguishable from imagery actually captured by a camera capturing a live set. However, in other embodiments, the disclosed techniques may be employed to generate imagery that is not photorealistic, such as graphical or animation or cartoon-like renderings. Moreover, although many aspects of the disclosed platform are described with respect to capturing and generating interactive imagery for a single object, the disclosed techniques may be similarly extended to a plurality of objects, or, more generally, a scene comprising a set of one or more objects.

FIG. 1 is a high level block diagram illustrating an embodiment of the disclosed content generation platform. As depicted, content generation platform 100 comprises three stages: a first stage comprising a backend stage 102, a second stage comprising an image processing stage 104, and a third stage comprising a front end stage 106. In backend stage 102, capture application 108 facilitates capture of one or more sets of images of an object or scene in imaging studio 110. The output of backend stage 102 comprises one or more sets of raw images 112 captured in imaging studio 110 that are input into the next stage of content generation platform 100, i.e., image processing stage 104. For example, capture application 108 facilitates uploading of raw images 112 to (cloud-based) image processing stage 104. Image processing stage 104 processes input raw images 112 at least in part using one or more artificial intelligence or machine learning based processes to generate and output a corresponding interactive image 114. Interactive image 114 comprises a plurality of interactive or user configurable features. More specifically, interactive image 114 comprises a two-dimensional image with at least partial three-dimensional capabilities. Examples of interactive features of interactive image 114 comprise one or more options for modifying image or scene composition; modifying object size, orientation, and/or placement; modifying lighting and shadows (relighting); modifying background or environment; modifying surface drapings, i.e., swapping textures or materials of surfaces; modifying camera pose and zoom including providing novel views not captured with a camera in imaging studio 110; etc. The interactive image 114 output by image processing stage 104 is input into the next stage of content generation platform 100, i.e., front end stage 106. Front end stage 106 includes front end application 116 via which a user 118 may edit or modify the generated interactive image 114 according to user preferences. The output of front end stage 106 or, more generally, content generation platform 100 comprises output image 120. In some embodiments, one or more of the interactive features available with respect to interactive image 114 are also available with respect to output image 120.

Figure 2:
FIG. 2 is a flow diagram illustrating an embodiment of a process for generating an interactive image.
Figure 2:
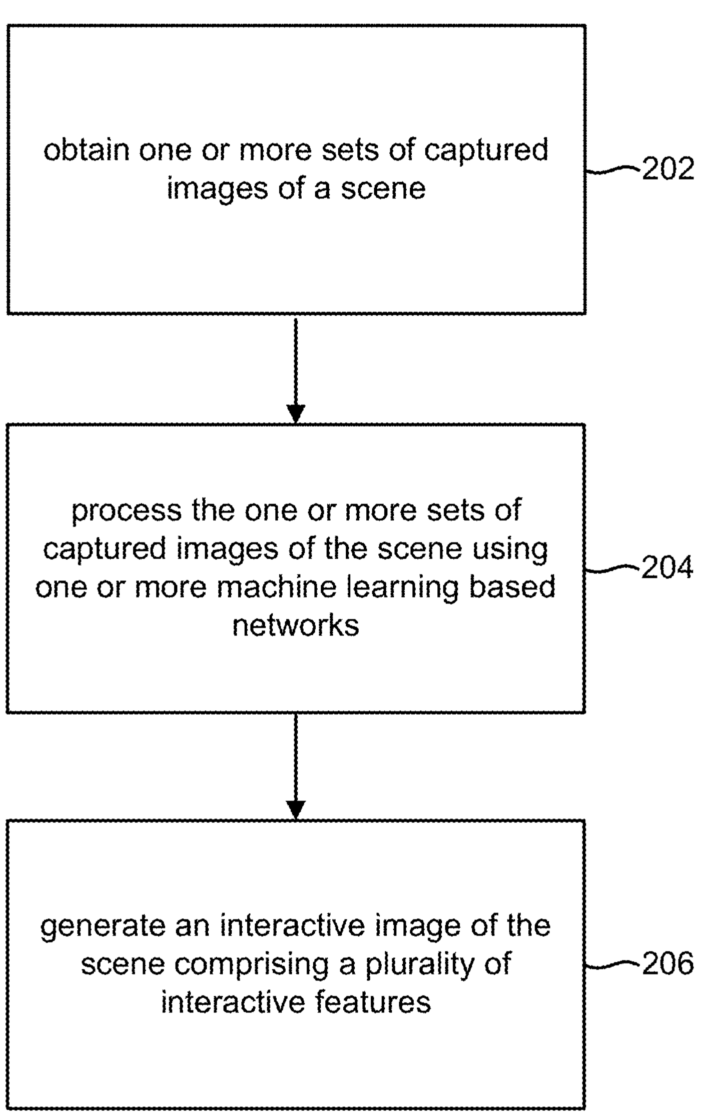

FIG. 2 is a flow diagram illustrating an embodiment of a process for generating an interactive image. In some embodiments, process 200 is employed by content generation platform 100 of FIG. 1. For example, process 200 may be employed by image process stage 104 of content generation platform 100 of FIG. 1. At step 202, one or more sets of captured images of a scene are obtained or received as input. That is, camera captured raw images of the scene are obtained at step 202. At step 204, the one or more sets of captured images of the scene are processed, for example, using one or more machine learning based networks. In some cases, one or more of the machine learning based networks are trained at least in part on training images constrained to a prescribed scene type to which the scene belongs. At step 206, an interactive image of the scene comprising a plurality of interactive features is generated. The generated interactive image comprises a two-dimensional image of the scene with at least partial three-dimensional capabilities. A plurality of machine learning based networks facilitates capturing and processing of raw camera images of the scene to generate the interactive image of the scene. One or more of the plurality of machine learning based networks are trained at least in part on training images constrained to a prescribed scene type to which the scene belongs.

The disclosed content generation platform comprises a self-served platform that is available to users to generate custom content that is publishable for various use cases. For example, the disclosed content generation platform may be employed by manufacturers or retailers of products (or items or assets) to generate custom imagery that is publishable, e.g., on a product page of an e-commerce web site, as an advertisement, in a printed catalog, etc. Moreover, the disclosed content generation platform may be used to directly create web pages and interactive applications with multiple differently processed images embedded in the pages or applications. As another example, the disclosed content generation platform may be employed to generate CGI (computer generated imagery) content that may be used for a variety of applications, e.g., filmmaking, gaming, augmented or virtual reality, etc. The disclosed content generation platform provides to the user a dedicated photography studio (imaging rig) in which a user photographs an object or item as guided by an interactive capture application associated with the disclosed content generation platform. The raw images of an asset captured within the imaging rig comprise a digital specification of the captured asset and are processed by various (cloud-based) artificial intelligence based processes associated with the disclosed content generation platform to generate highly flexible interactive imagery of the asset that is provided to an end user on a front end application of the disclosed content generation platform. On the front end application, the user is provided options to further manipulate the imagery as desired, publish the imagery, provide interactive applications with respect to the imagery, etc. The disclosed content generation platform generated content may be employed with respect to many interactive applications including, for example, generating a 360 degrees interactive spin capability around an imaged object or even a full augmented reality or virtual reality experience such as a room or space planning or designing application in which any one or more objects may be introduced into a room or space and manipulated as desired in a perspective correct manner and with consistent and correct lighting and lighting effects such as shadows. The output imagery generated using the disclosed content generation platform is similar to and in many cases indistinguishable from imagery generated using PBR (physically based rendering) techniques and underlying three-dimensional polygon mesh models and material specifications. Moreover, the output two-dimensional imagery generated using the disclosed content generation platform comprises many features that are typically available only with respect to three-dimensional content.

The need for high quality (photorealistic) imagery exists with respect to many industries and applications. However, obtaining such imagery is not only difficult but time consuming and costly using traditional content generation techniques. The disclosed content generation platform provides a new paradigm for generating content, providing unprecedented flexibility to the end user with respect to the generated content. The disclosed content generation platform facilitates going from capturing one or more photographs of an object to high quality and flexible publishable imagery in a matter of minutes. More specifically, the disclosed content generation platform brings a photo studio (imaging rig) to a backend user and completely automates the photography process (simply place an object in the imaging rig, press a button on an interactive capture application, and obtain a perfect professional shot of the photographed object) with the perfect (expert) lighting and (perfect white) background and flooring built right in so that all images captured are consistent for different types of objects having different material (texture) and optical properties, while providing the ability to match unique end user aesthetics every time. The captured photographs are processed by various machine learning (ML) based algorithms to generate flexible and interactive output imagery. In some embodiments, the photographs captured in the imaging rig are uploaded via the capture application of the disclosed content generation platform to a cloud based artificial intelligence (AI) processing stage of the disclosed content generation platform. A user on the front end may use the AI perfected photo as directly generated from the disclosed content generation platform or customize it using a user interface of a front end application associated with the disclosed content generation platform that includes standard and novel image manipulation features, including masking and shadowing tools, lighting controls, (photorealistic) background addition, etc., with various file types/formats, sizes, and resolutions supported.

The disclosed content generation platform comprises an onsite hardware assembly or installation, i.e., a photo studio or imaging rig, where objects or items are photographed. For example, such an imaging rig may be installed at a manufacturer's site to photograph manufactured products. The imaging rig may be customized based on the types of objects or items photographed within the rig and/or based on backend user needs. In some embodiments, the imaging rig may comprise a boxed enclosure having white surfaces with a plurality of lighting (LED) arrays, one or more (stereo) cameras, a display monitor and/or laser projector to guide object placement within the rig, a turntable for capturing various angles of an object being photographed, etc. Various components comprising the imaging rig are automatically adjustable and/or movable to facilitate capturing different object views, lighting conditions and corresponding effects such as reflections and shadows, camera perspectives or poses, etc., of an item being photographed within the rig. Moreover, fixtures for specific categories of objects may be installed in the imaging rig, e.g., a structure to support and provide power to a chandelier. The disclosed content generation platform also comprises a native capture application that runs on a computing device that in some cases is situated outside the imaging rig that controls the imaging taking place within the imaging rig. For example, the capture application guides user placement of an item (or relative placement of multiple items) being photographed within the imaging rig. Moreover, the capture application facilitates the actual capture process by appropriately automatically positioning, adjusting configurable options, and/or activating various components comprising the imaging rig to capture desired images of the item(s) being photographed in the rig. Furthermore, the capture application facilitates transmitting raw images captured in the imaging rig and associated metadata like camera position to an artificial intelligence processing stage of the disclosed content generation platform. For example, the capture application may upload the captured raw images to a cloud application associated with the disclosed content generation platform that is configured to process the raw images via one or more machine learning based algorithms. The output of the artificial intelligence processing stage comprises output interactive imagery provided to a front end user, e.g., via a browser accessible front end user application comprising the disclosed content generation platform via which a front end user may use and/or further manipulate the generated interactive imagery according to desired preferences and control tools provided via an associated user interface. For example, a user may manipulate generated interactive imagery using standard and novel image editing tools provided via the user interface, including changing object sizes, object placement locations or orientations, camera poses, camera zoom level, colors, backgrounds, lighting and shadows, etc. File type/format, size, resolution, etc., may also be adjusted as desired. Moreover, the front end user may download and/or publish possibly edited interactive imagery via the front end application of the disclosed content generation platform. Interactive imagery generated using the disclosed content generation platform may furthermore be employed to facilitate interactive applications for improved virtual experiences. One example of such an interactive application comprises an application to composite a plurality of objects or items to create more complex scenes, wherein independent captures of multiple objects are combined or composited in a consistent manner with respect to perspective and lighting effects that results in a (photo) realistic view of the composite scene, similar to or indistinguishable from what is captured by a camera when shooting on a live set or generated via PBR based techniques. In some embodiments, the front end user application comprises a Saas (software as a service) application that can be accessed by a browser. In some embodiments, a sharing system is supported by the front end user application via which a user account (e.g., of a manufacturer) may share imagery with one or more other users or partners (e.g., retailers), who may then use the shared imagery to create their own custom curated content. Generally, the front end application provides the interactive imagery generated by the disclosed content generation platform. However, in some embodiments, the raw captured data is not provided via the front end application, i.e., the raw data sits on the cloud for use by the artificial intelligence stage, including for understanding and generating the interactive imagery and associated metadata needed to make the interactive imagery flexible on the front end application. The raw data may also be used to further train the artificial intelligence stage, which improves over time as more and different types of objects and scenes are encountered and processed.

The disclosed content generation platform is not merely an image scanning platform. Rather, a relatively small or minimum number of images of one or more views of an object are captured within a fairly simple imaging studio or apparatus, which provides a completely known and controlled physical imaging environment. Thus, in most cases, a large and diverse set of images needed to generate a three-dimensional (3D) model or specification of an object using standard three-dimensional model generation or scanning techniques is not needed. However, in many cases, various features that have traditionally required an underlying three-dimensional model or specification are provided with a relatively small number of captured images of a photographed item using a plurality of image processing techniques, including a plurality of machine learning (neural network) based techniques. In some such cases, the neural networks are trained on very large datasets of constrained sets of objects or object types, e.g., associated with a prescribed scene or scene type, and objects or scenes captured using the imaging rig comprise the same object or scene types that the corresponding machine learning networks are trained on. Thus, information learned from extensive assets databases comprising imagery generated from underlying three dimensional models that corresponding neural networks are trained on is used to predict or estimate or generate similar information for an object or scene of the same type using just a small number of captured images of the object or scene. Because objects being photographed in the imaging rig are known and constrained to a prescribed object or scene type, a relatively small number of images of a photographed object may be employed and later post processed using corresponding machine learning based algorithms to generate more sophisticated imagery of the object with modifiable, interactive features, including many features that are otherwise only available if a full underlying three-dimensional model or specification exists. Thus, deep artificial intelligence techniques employed within the image processing pipeline of the disclosed content generation platform facilitate complex features, functionalities, and applications with the disclosed content generation platform output imagery with a relatively simple set of input images captured within the imaging rig.

Figure 3:
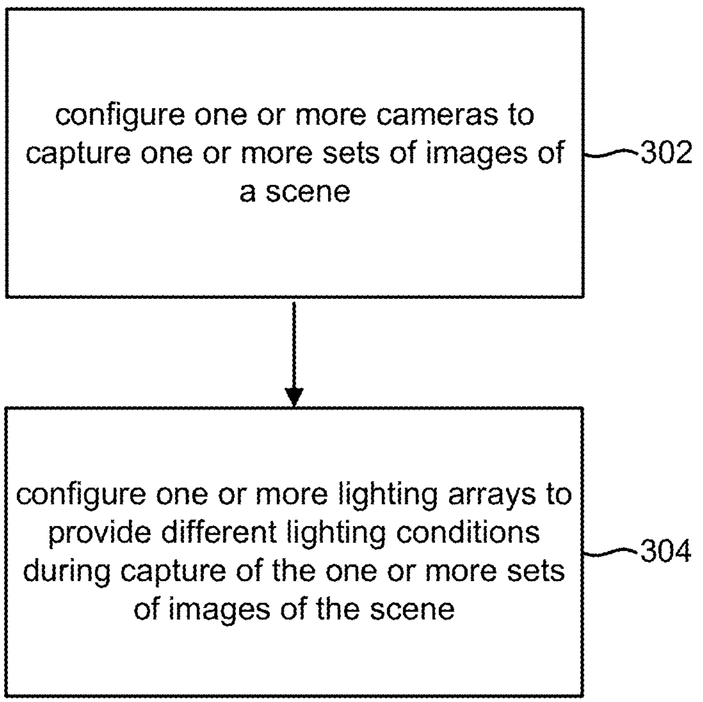
FIG. 3 is a flow diagram illustrating an embodiment of a process for configuring an imaging studio for capturing raw images used to generate an interactive image.

FIG. 3 is a flow diagram illustrating an embodiment of a process for configuring an imaging studio for capturing raw images used to generate an interactive image. In some embodiments, process 300 is employed by content generation platform 100 of FIG. 1. For example, process 300 is employed to configure imaging studio 110 of content generation platform 100 of FIG. 1. At step 302, one or more cameras are configured to capture one or more sets of images of a scene. At step 304, one or more lighting arrays are configured to provide different lighting conditions during capture of the one or more sets of images of the scene. At a next stage of the disclosed content generation platform, the captured one or more sets of images of the scene are processed using one or more machine learning based networks to generate an interactive image of the scene comprising a plurality of interactive features, including interactive camera and lighting options.

As described, the disclosed content generation platform comprises various hardware and software components. Although some embodiments are described for the purposes of example, the imaging studio or rig may generally comprise any other appropriate types and combinations of various components such as the mechanical frame and other support structures, surface fabrics or materials, lighting structures, cameras, display or projector to guide placement, turntable to capture different object views, controllers, etc. The imaging rig or studio comprises a well-defined, i.e., completely known, controlled physical environment in which images are captured of objects placed inside the studio. The studio comprises a prescribed shape and geometrical configuration with prescribed materials comprising various surfaces of the studio. In one example, the studio comprises a boxed enclosure, e.g., with an aluminum frame and surfaces (floor, walls, and ceiling) constructed from white materials. Various electronic, mechanical, and optical components are included inside the studio. Lighting arrays or modules are strategically situated around the studio and may be fixed in place (stationary) or may be movable. A lighting array may comprise a plurality of lighting panels or boards. A back wall or surface of the studio, which serves as a background of the object being photographed, is completely plain and white, as is the portion of the floor on which the object is placed. In some cases, lighting arrays are situated on both corners of the back wall so that they do not appear in captured images but can be used to provide back lights. A plurality of lighting arrays is situated on the front and side walls to provide different lighting conditions and effects while capturing images. Lighting arrays may also be installed on various parts of the ceiling and/or floor of the studio. Different lighting arrays or panels or parts thereof may be selectively activated for different captures, e.g., to obtain image data that shows how different lighting interacts with the object being photographed in different ways. For example, one set of lighting panels may be activated for a first capture, a different set of lighting panels may be activated for a next capture, and so forth, such that several captures are iteratively performed in sequence with different lighting conditions and resulting effects. In some embodiments, different lighting conditions include different light colors. The studio furthermore comprises one or more cameras, which may be mounted on one or more rails or rigs that facilitate automatic movement of the cameras to different poses or perspectives, e.g., during different captures. The studio may generally comprise one or more stationary cameras and/or cameras that may be moved along any desired axis or axes with respect to the object being photographed and/or around the studio, such as up/down, left/right, front/back, diagonally, partially rotating around an axis in front of the object, completely rotating around the object, etc. In some embodiments, the studio comprises a pair of cameras for stereo captures. In some embodiments, cameras are mounted on a long vertical rail which provides camera movement along two axes: tilt and up/down vertical movement along the rail. In some such cases, a camera rig/rail is mounted on the front wall of the studio, i.e., opposite the back wall against which objects are photographed. In order to initiate a capture, a user simply needs to place an object in an appropriate location within the studio and select appropriate options in a user interface of a capture application running on a computing device situated at the exterior of the studio that operates as a controller of the studio. In some embodiments, the capture application is configured to learn user preferences so that the same or similar preferences can be suggested or selected as default options for future captures. The capture application guides a user with appropriate placement of an object within the studio. Once an object is appropriately placed inside the studio by the user and user configurable options are specified as well as a capture option selected in the associated user interface by the user, the capture application facilitates a process for capturing a plurality of images of the object in the studio, including appropriately automatically positioning, adjusting, and/or activating lighting panels, cameras, turntables, and/or other parts of the studio as a series of images are shot by the cameras. Several images may be captured, e.g., with different lighting conditions and/or camera poses and/or object views or orientations. As one example, during a capture session, each of a pair of stereo cameras captures nine images for a prescribed object orientation, for a total of eighteen captures per object view. A single capture session for a prescribed object orientation is fairly quick, i.e., usually not longer than thirty seconds in duration. Multiple capture sessions may be performed for the same object for different object orientations. For example, five or six capture sessions may be needed for different views around an object for later providing full arbitrary view control with respect to the object, i.e., complete 360 navigation capability around the object. In various embodiments, a user may need to physically move an object to capture different views, or a turntable may be included in the studio to automatically move an object to capture different views.

Figure 4:
FIG. 4 is a flow diagram illustrating an embodiment of a process associated with a capture application that controls the imaging taking place within an imaging studio.
Figure 4:
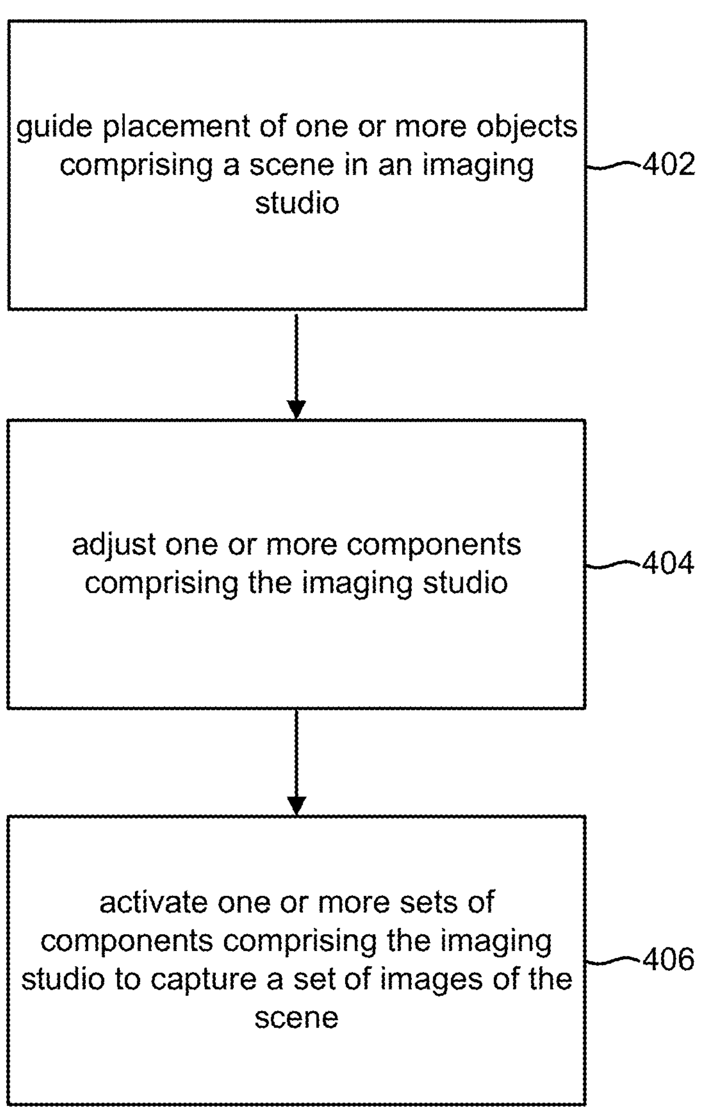

FIG. 4 is a flow diagram illustrating an embodiment of a process associated with a capture application that controls the imaging taking place within an imaging studio. In some embodiments, process 400 is employed by content generation platform 100 of FIG. 1. More specifically, process 400 is employed by capture application 108 of content generation platform 100 of FIG. 1. At step 402, placement of one or more objects comprising a scene in an imaging studio is guided by the capture application. At step 404, the capture application facilitates adjusting one or more components comprising the imaging studio. At step 406, the capture application activates one or more sets of components comprising the imaging studio to capture a set of images of the scene. Process 400 may be iterated or sequentially performed multiple times to capture a plurality of sets of images of the scene, which sets of images of the scene are used to generate an interactive image of the scene comprising a plurality of interactive features.

Figure 5:
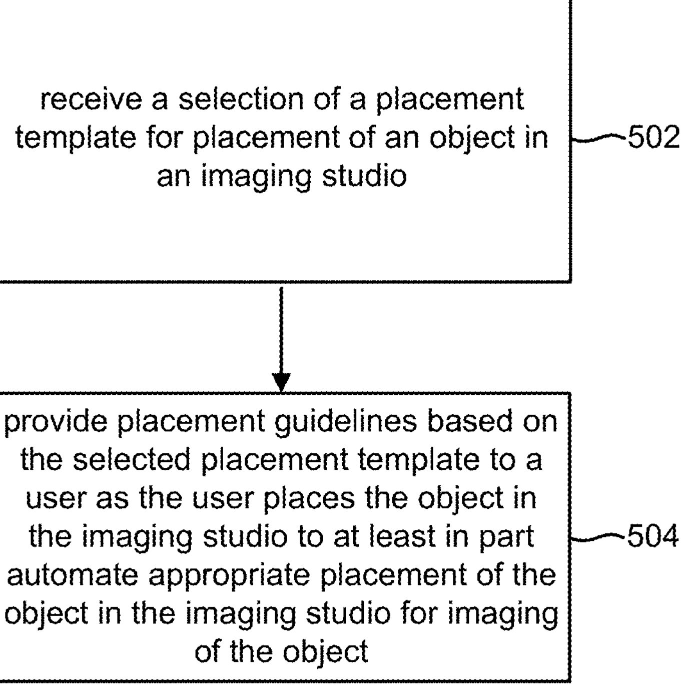
FIG. 5 is a flow diagram illustrating an embodiment of a process for at least in part automating placement of an object in an imaging studio.

FIG. 5 is a flow diagram illustrating an embodiment of a process for at least in part automating placement of an object in an imaging studio. In some embodiments, process 500 is employed by content generation platform 100 of FIG. 1. For example, process 500 is employed by capture application 108 of content generation platform 100 of FIG. 1. In some embodiments, process 500 comprises step 402 of process 400 of FIG. 4. At step 502, a selection of a placement template for placement of an object in an imaging studio is received. At step 504, placement guidelines based on the selected placement template are provided to a user as the user places the object in the imaging studio to at least in part automate appropriate placement of the object in the imaging studio for imaging of the object. For example, placement guidelines may be projected on the floor of the imaging studio or may be rendered on a display monitor inside the studio that is used for previewing the capture. A set of images of the object captured in the imaging studio is used to at least in part generate an interactive image of the object.

In some embodiments, the disclosed content generation platform facilitates guided or assisted placement of an object within the studio since a user may not know how to appropriately position or place or orient an object within the studio. In photography, common or standard poses and angles are often used for prescribed object or scene types. For example, chair objects in photographs of chairs published by a prescribed retailer may all be similarly orientated and may satisfy a prescribed brand aesthetic. The same is true for other object and/or scene types. In some embodiments, popular or frequently occurring views or poses are learned or identified via machine learning based algorithms trained on large asset datasets and used to generate corresponding placement and/or orientation templates that are then used by the backend capture application of the disclosed content generation platform. A set of templates may be created for a prescribed object and/or scene type or category, and different sets of templates may be created for different object and/or scene types or categories. In some embodiments, one or more templates may be associated with an item type associated with prescribed SKU (stock keeping unit) attributes. In some such cases, the capture application may comprise a plugin or connector into a SKU management system or platform via which an item type may be specified, e.g., so that appropriate templates may be selected or presented for consideration. A set of templates may comprise, for instance, templates for a front view, a back view, a left side view, a right side view, a top view, a bottom view, a quarter view, a three quarters view, and/or a close up detail view. With respect to the disclosed content generation platform, a user may select an appropriate template for object placement within the studio via the user interface of the capture application. Alternatively, the capture application may automatically select an appropriate template, e.g., based on the object or scene being photographed. Based on the selected template for a given capture, the capture application will instruct and guide the user on where to place an object within the studio by helping with proper alignment and orientation and will furthermore facilitate automatically adjusting and/or moving cameras according to the selected template. In some embodiments, the studio comprises a display monitor or screen, e.g., mounted on a front wall of the studio, that is used to guide object placement as well as camera framing. A (near) real time video stream of a user placing an object in the studio is displayed on the screen along with guidelines and markers that instruct the user on how to appropriately position and orient the object being placed in the studio. More specifically, in some embodiments, a machine learning based algorithm provides (near) real time (e.g., 15 fps or 30 fps) masking of a user and the object(s) being placed as the user is placing the object(s) within the studio. That is, real time background subtraction is provided that results in a foreground mask of the user and object(s) being placed. Context, i.e., where the floor and walls and ceiling of the studio are situated relative to the detected user and object(s), is inferred from a known geometry of the studio, and guidelines and/or other markers are provided on the display screen with respect to these surfaces and based in part on the selected template. Thus, during object placement, a user is able to see (masks of) himself/herself as well as the object being placed on the monitor or screen in addition to context features (boundaries between floor, walls, and/or ceiling) as well as appropriate guidelines or markers instructing placement, such as a red cross indicating a position at which to align the object or a part thereof, horizontal and/or vertical gridlines with respect to which object edges need to be aligned, a bounding box or other shape in which to center the object, etc. In some embodiments, instead of and/or in addition to providing placement guidelines or markers via a monitor or screen included in the studio via which a user can appropriately position and orient an object, guidelines are directly projected on to the surfaces (floor, walls, ceiling) of the studio, e.g., using a (laser) projector. Thus, appropriate object placement in the studio is mostly automated and in many cases does not require user input beyond physically moving an object as directed. Moreover, in some embodiments, the studio includes a turntable, and, in such cases, the user simply needs to place or center the object on the turntable, which is then automatically controlled (moved as needed) via control instructions from the capture application. In some embodiments, the capture application cycles through a prescribed set of templates for a sequence of captures so that multiple and diverse views around an object may be sequentially captured.

Figure 6:
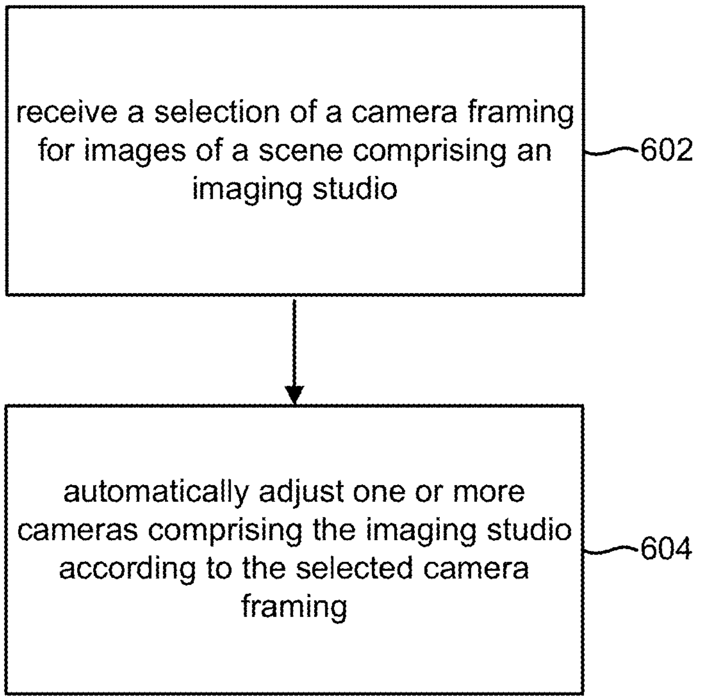
FIG. 6 is a flow diagram illustrating an embodiment of a process for automatically adjusting one or more cameras comprising an imaging studio.

FIG. 6 is a flow diagram illustrating an embodiment of a process for automatically adjusting one or more cameras comprising an imaging studio. In some embodiments, process 600 is employed by content generation platform 100 of FIG. 1. For example, process 600 is employed by capture application 108 of content generation platform 100 of FIG. 1. In some embodiments, process 600 comprises step 404 of process 400 of FIG. 4. At step 602, a selection of a camera framing for images of a scene comprising an imaging studio is received. At step 604, one or more cameras comprising the imaging studio are automatically adjusted according to the selected camera framing. A set of images of the scene captured by the one or more cameras in the imaging studio is used to at least in part generate an interactive image of the scene.

The disclosed content generation platform may at least in part facilitate automatic framing, i.e., automatic selection of appropriate poses or perspectives of cameras comprising the imaging studio. Like object placement, camera pose or framing may also be learned using machine learning based networks trained on extensive asset datasets and used to generate corresponding framing templates and/or to automatically select framing. In some embodiments, deep learning is employed to generate framing templates for various types or categories of objects or scenes. Different framing templates may be generated for different types or categories of objects or scenes. In various embodiments, the capture application of the disclosed content generation platform may automatically select or provide options to a user to select or specify framing of images of objects captured in the imaging studio. In some cases, one or more framing templates may be provided for user selection. An automatically or user selected camera framing may be based on, for example, object or scene type, preferred aesthetics, relative size preservation preferences, fill preferences, etc. For instance, for a selected eighty percent fill, the capture application facilitates adjusting camera parameters such that the object being photographed comprises eighty percent of captured images. In other embodiments, camera framing may completely be automated. In some such cases, for instance, an object may be automatically detected and identified as it is pulled into the imaging studio by a user based on automatic masking of the object and a visual search against a database of known assets, a framing for the object may automatically be selected from images of similar objects in the database, and cameras may automatically be adjusted according to the selected framing. Thus, in some cases, a user needs to simply place an object in the imaging studio, and the object is automatically recognized and framed without user input.

Various features of the disclosed content generation platform are based on deep learning (DL) and artificial intelligence (AI) based techniques. The various neural networks employed with respect to the disclosed content generation platform are trained to learn prescribed features from extensive training datasets constrained to images of similar objects or scenes for which the prescribed features are known and well-defined. For example, images comprising the training datasets may be rendered from corresponding three-dimensional object or scene models and tagged or labeled with relevant metadata associated with the features that are learned by the neural networks. Various interactive applications facilitated by the disclosed content generation platform are feasible due to the neural networks used by the platform having learned associated features through extensive training on images of objects or scenes having similar features or characteristics. A summary of some of the machine learning based techniques used by the disclosed content generation platform follows. The disclosed content generation platform may comprise machine learning based object placement templates. The disclosed content generation platform may comprise machine learning based camera framing templates. The disclosed content generation platform may comprise machine learning based real time masking or background subtraction, e.g., during object placement. The disclosed content generation platform may comprise machine learning based depth estimation, i.e., an estimate of depth or xyz coordinates of each pixel of a captured image. The disclosed content generation platform may comprise machine learning based surface normal estimation, i.e., an estimate of surface normal vectors at each pixel of a captured image for correct lighting effects. The disclosed content generation platform may comprise machine learning based object recognition, e.g., a visual search to find a closest matching existing object in a database of known assets. The disclosed content generation platform may comprise machine learning based shadow estimation, i.e., for more consistent shadow effects. Images captured in the imaging studio or apparatus of the disclosed content generation platform comprise raw image data, similar to raw data produced by sensors. The captured raw data is processed via one or more machine learning based networks to transform the captured raw data into interactive imagery that can be modified or manipulated as desired, such as interactive control of camera pose and zoom (including novel views not captured by a camera), lighting, shadow, background, color, texture (draping), etc. Such interactive and modifiable features are typically feasible via physically based rendering from three-dimensional (3D) object specifications or models. However, the disclosed content generation platform employs a small set of captured two-dimensional images coupled with artificial intelligence to provide similar flexibility and features. Thus, the disclosed content generation platform provides most of the benefits of 3D without actual 3D content creation in many cases. The disclosed content generation platform may be employed to facilitate a variety of interactive applications such as consistently compositing a plurality of individually captured objects, moving around a plurality of objects in a scene in a perspective correct manner as if the objects occupy 3D space, 360 degrees navigation around an object, etc.

Generating a point cloud representation of an object, e.g., to create a three-dimensional model or representation of the object, has traditionally been a tedious task that typically involves expensive scanners as well as conducive scanning conditions. Featureless objects or objects with very few features frequently confound scanning devices. That is, most scanners fail when scanning objects that are not feature rich, such as objects comprising plain materials or having reflective or glassy or glossy surfaces. Moreover, certain lighting conditions, such as a brightly lit object, often result in scanners not being able to scan properly. The disclosed content generation platform provides a novel paradigm for point cloud generation of an object or scene based on captures of a handful of different views around an object or scene and based on machine learning based networks trained to identify point clouds by learning from extensive image datasets comprising similar objects or scenes that have well-defined point cloud specifications. As previously described, the disclosed content generation platform leverages machine learning based networks for estimating depth values of pixels of captured images associated with a prescribed view or orientation of an object, which, in turn, may be employed to generate a corresponding point cloud representation of the portion of the object corresponding to the prescribed view. For each of a plurality of different views or orientations (e.g., front, back, left side, right side, top, bottom) of an object captured in the imaging rig, depth values are determined and a portion of a point cloud corresponding to each view may be generated therefrom. If the plurality of different views comprises a sufficiently diverse set of views around the object, a viable point cloud of the object may be generated, for example, by registering or combining the plurality of portions of point clouds generated for each view and by cleaning the resulting point cloud as applicable, e.g., by filling in holes such as by interpolation. The resulting complete point cloud may then be used to generate a corresponding three-dimensional model of the object or mesh, which can be used for features such as changing lighting, textures, etc. Thus, the disclosed content generation platform facilitates complete three-dimensional model and/or mesh generation as well as resulting applications via simply capturing images associated with a small number of views of an object or scene.

In some embodiments, a point cloud generated from a single view of an object via machine learning is employed to generate a corresponding mesh associated with that view. The point cloud is generated based on depth values determined via machine learning. The machine learned point cloud and known camera pose associated with the point cloud are employed to generate the corresponding mesh. The generated mesh may be employed to provide similar features as traditional three-dimensional renderers (e.g., OpenGL) such as changing texture or material swapping or draping, relighting, etc. In some embodiments, the generated point cloud corresponds to a portion of a complete point cloud of an object, and the generated mesh corresponds to a portion of a complete mesh of the object. Thus, many features that are only typically available with three-dimensional mesh models are facilitated via a partial machine learned point cloud and corresponding mesh. As one use case, for instance, a machine learned point cloud and known camera pose may be used to generate a corresponding mesh of one view of a sample object captured in the imaging studio, and other versions of the same object having the same view but different textures may be generated from the corresponding mesh by simply swapping materials. In some embodiments, the described mesh generation techniques for one view of an object may be similarly extended to multiple views around an object, including enough views to generate a complete three-dimensional mesh of the object as previously described.

Figure 7:
FIG. 7 is a flow diagram illustrating an embodiment of a process for point cloud generation.
Figure 7:
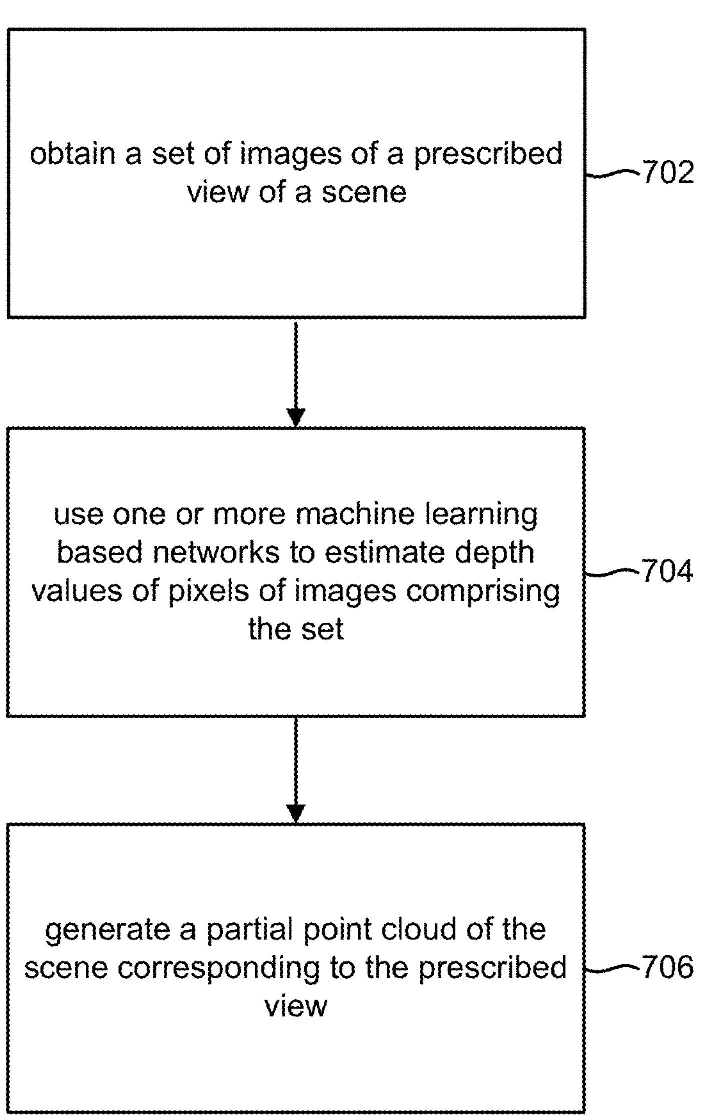

FIG. 7 is a flow diagram illustrating an embodiment of a process for point cloud generation. In some embodiments, process 700 is employed by content generation platform 100 of FIG. 1. For example, process 700 may be employed by image process stage 104 of content generation platform 100 of FIG. 1. At step 702, a set of images of a prescribed view of a scene is obtained. At step 704, one or more machine learning based networks are used to estimate depth values of pixels of images comprising the set. At step 706, a partial point cloud of the scene corresponding to the prescribed view is generated. A complete point cloud of the scene may be generated by combining partial point clouds corresponding to a plurality of views of the scene.

The disclosed content generation platform in many embodiments facilitates providing features traditionally available only with three-dimensional content with very limited two-dimensional data. For example, physically based rendering with respect to a three-dimensional mesh model provides flexibility with respect to lighting and shadows and textures. However, similar flexibility is provided with the disclosed content generation platform using limited captured two-dimensional data. Thus, what is typically relegated to the three-dimensional world is done by the disclosed content generation platform with respect to two-dimensional data using machine learning based techniques. That is, the disclosed content generation platform supports flexible lighting and shadow effects and textures similar to what traditionally would require a complete underlying three-dimensional model. In some embodiments, a capture of a prescribed view of an object in the imaging rig comprises activating different lighting arrays or panels or parts thereof to capture multiple images (e.g., nine images per camera, eighteen images per stereo camera pair) having different lighting and shadow effects so that flexibility with lighting and shadows can later be provided with respect to the front end application of the disclosed content generation platform. Various configurable options with respect to (re) lighting and shadows in the final output imagery in the front end application of the disclosed content generation platform are generated from raw captured data using one or more associated machine learning based networks. In some embodiments, one or more machine learning based networks are employed to extract lighting information of and physical shadows cast by the lights in the imaging studio in captured images of an object. That is, the machine learning based networks are used to virtualize lights and shadows. Extracted shadows comprise intensity values at each pixel. The extracted shadows may be appropriately blended or mixed, e.g., using superposition, on the floor or ground and on the object. Lights may also be similarly blended or mixed. In the front end application, a combination of different virtualized lights and shadows facilitates creating different lighting and shadow effects. In some embodiments, the front end application comprises a relighting feature based on a relighting model comprising a key light, a fill light, and a rim light. Baseline lights and shadows are extracted by the machine learning based networks from two-dimensional capture data, and virtualized lights and shadows are introduced in the front end application. Many features not possible with conventional two-dimensional tools, such as relighting, flexible backgrounds, ability to have shadows interact with light, etc., are possible with the disclosed content generation platform. The resulting possibly manipulated output imagery is self-consistent with respect to lights and shadows regardless of various environments or backgrounds used. As lighting is altered in the interactive imagery (e.g., moved to a different position, changed in intensity, etc.), a dynamically provided output image appears naturally composed and/or composited, even when an environment or background template is changed.

Figure 8:
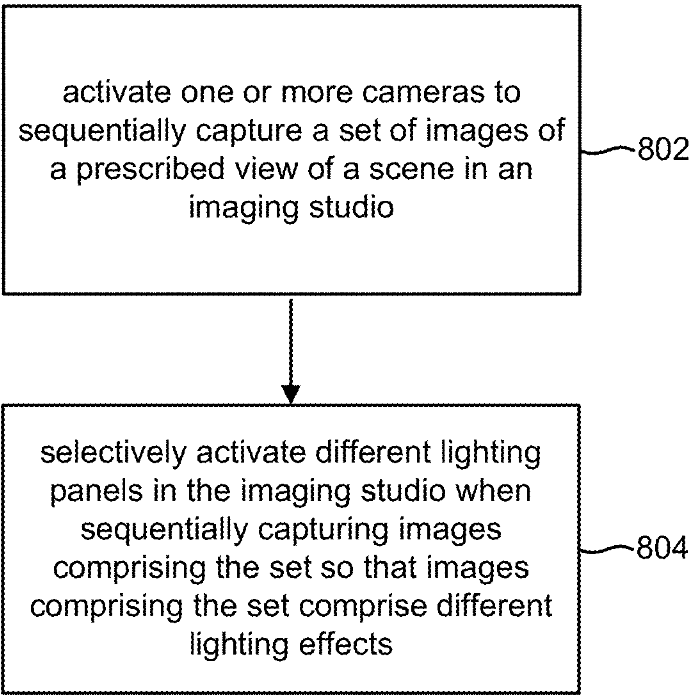
FIG. 8 is a flow diagram illustrating an embodiment of a process for automatically activating components comprising an imaging studio.

FIG. 8 is a flow diagram illustrating an embodiment of a process for automatically activating components comprising an imaging studio. In some embodiments, process 800 is employed by content generation platform 100 of FIG. 1. For example, process 800 is employed by capture application 108 of content generation platform 100 of FIG. 1. In some embodiments, process 800 comprises step 406 of process 400 of FIG. 4. At step 802, one or more cameras are activated to sequentially capture a set of images of a prescribed view of a scene in an imaging studio. At step 804, different lighting panels in the imaging studio are selectively activated when sequentially capturing images comprising the set so that images comprising the set comprise different lighting effects. The set of images is used to at least in part generate an interactive image of the scene comprising one or more options for modifying lighting.

As described, the disclosed content generation platform pipeline comprises various stages. A backend stage is associated with capturing a set of one or more images of an object in an imaging studio. In this stage, a user selects one or more configurable capture options via a user interface of a capture application. Alternatively, one or more such capture options may be automatically selected by the capture application. The user physically places and orients an object in the imaging studio according to provided guidelines or markers, which may be based on a selected template. After appropriately placing and orienting the object inside the studio, the user steps outside of the studio and selects one or more further options in the capture application, including an option to capture. In response to selection of an option to capture, the capture application facilitates capturing images inside the studio. One or more components within the studio may be automatically and appropriately configured or adjusted or positioned prior to the capture via control signals from the capture application. Captured images may be inspected post capture, e.g., to determine if the captured images are as desired and/or whether a retake is needed. In some embodiments, a set of captured images comprises a plurality of images for a prescribed view of the object. A plurality of sets of captured images may be captured for a plurality of different views of the object. Captured images are input, e.g., by the capture application, to a middle stage of the pipeline comprising an artificial intelligence (AI) processing stage. In some embodiments, captured images are uploaded to a cloud-based AI stage. In this stage, raw captured images are abstracted and/or converted into interactive imagery having various configurable features. The generated interactive imagery is finally provided to a front end stage, e.g., to a front end user via a user interface of a front end application. At the front end stage, the generated interactive imagery may be used and/or further manipulated by a front end user as desired. In some embodiments, the front end application is user account controlled. Generally, the front end application provides various features and functionalities to a user including access to generated images such as in a list or gallery view; standard image editing options such as controls for modifying saturation, exposure, contrast, etc.; options to modify environment or background including support for custom backgrounds, e.g., which may be uploaded by the user; options to modify lighting including options to independently adjust abstracted (back, key, fill) or individual studio lights as well as lighting colors; options to modify shadows including shadow blur, length, and/or strength; etc. In some embodiments, various configurable options of the interactive imagery may be converted into corresponding sets of templates or filters, e.g., to offload the task of manually adjusting various controls from a user. Instead, a user may select different image compositions (e.g., backgrounds, lighting, shadows, coloring, etc.) from such templates. The sets of templates may be learned using one or more machine learning based networks. The front end application is furthermore employed by a user to download, publish, and/or share generated interactive imagery and/or associated interactive applications. The disclosed content generation platform pipeline is in most cases highly efficient, going from capturing or imaging a physical asset to creating an interactive digital master asset with three dimensional capabilities to publishing a two dimensional or three dimensional virtual asset in mere minutes.

With the disclosed content generation platform, interactive imagery is generated based on input images captured in a tightly controlled imaging environment for which camera pose and environmental context (e.g., floors, walls, ceilings, etc.) and lighting are completely known. The heretofore disclosed content generation platform comprises a first content generation platform. In some embodiments, a second content generation platform for generating interactive images is disclosed herein that offers similar interactive features but for any arbitrary (monocular) input image that is captured in an unknown environment. For example, the input image could be captured by a mobile phone or randomly selected online from the internet. In some embodiments, an input image of the disclosed second content generation platform is at least in part constrained to a prescribed type of input image environment, such as an indoor environment (e.g., a room or similar enclosed space or structure) having surfaces such as a floor, walls, and/or a ceiling. In the disclosed first content generation platform, complete camera information as well as environmental context (e.g., relative locations of floors, walls, ceilings) are known for the imaging studio. However, in the disclosed second content generation platform, camera characteristics (e.g., pose, perspective, zoom, etc.) need to be determined for each arbitrary or at least initially unknown input image. Thus, with the disclosed second content generation platform, when an arbitrary input image comes in as input, determinations need to be made of where the camera is located (i.e., camera pose) in relation to surfaces (e.g., floors, walls, ceilings) comprising the image environment before the input image can be virtualized to generate interactive imagery similar to the first content generation platform.

Figure 9:
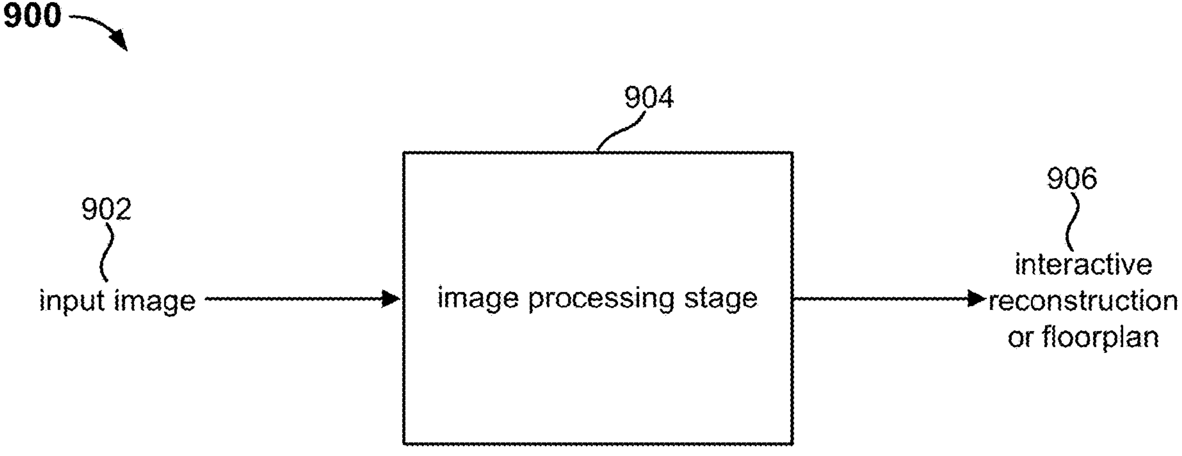
FIG. 9 is a high level block diagram illustrating an embodiment of the disclosed second content generation platform.

FIG. 9 is a high level block diagram illustrating an embodiment of the disclosed second content generation platform. In the disclosed second content generation platform 900, an arbitrary input image 902 is input into image processing stage 904. In some embodiments, input image 902 is constrained to indoor scenes. Image processing stage 904 processes input image 902 at least in part using one or more artificial intelligence or machine learning based processes to generate and output a corresponding interactive reconstruction or floorplan 906 of input image 902. In some embodiments, interactive reconstruction or floorplan 906 comprises a skeleton of a room or indoor space or other enclosed environment comprising the input image. Interactive reconstruction or floorplan 906 comprises various surfaces (individual walls, floor, ceiling) and may comprise corresponding mapped textures. In the disclosed second content generation platform 900, an interactive two-dimensional or three-dimensional reconstruction or floorplan 906 is generated from a single two-dimensional input image 902. In some embodiments, the disclosed second content generation platform 900 comprises a pipeline for producing three-dimensional models of rooms and items in the rooms.

Neural networks similar to those previously described with respect to the disclosed first content generation platform are employed to determine various features of an arbitrary input image into the disclosed second content generation platform. For example, machine learning based neural networks are employed to determine camera pose, depth values of pixels, surface normal vectors of pixels, masks of surfaces (floors, walls, ceilings) or parts thereof, lighting, shadows, etc. Moreover, various features such as objects and surfaces may be identified or detected in an input image via visual searches of assets databases, and, in some cases, objects in the input image are distinguished from structural surfaces (floors, walls, ceilings). In some embodiments, computer vision based wall separation techniques may be employed to identify different walls so that interactive features may be provided independently for different walls. Machine learned depth values and/or xyz coordinates as well as camera pose are then used to generate a high quality and accurate point cloud and corresponding three-dimensional mesh model of the space and/or other content comprising the input image. In some cases, planes are fitted to machine learned surfaces (floors, walls, ceilings) in the three-dimensional model. A visual search of existing assets databases is performed to find known specifications of textures or materials that are closest to corresponding materials in the input image. Existing closest matching textures are applied to the surfaces of the three-dimensional model to generate a high definition or resolution or quality space or room that closely models or represents the environment or scene of the input image and that is interactive in various ways. The generated space or room is in some embodiments empty, i.e., does not include any objects but just surfaces comprising the structure of the space (e.g., floors, walls, ceilings). In some cases, however, the generated space or room may include one or more objects, e.g., closest matching existing objects corresponding to objects that appear in the input image. In some embodiments, the generated space has the same or a similar camera view or pose as the input image. Alternatively, in some embodiments, other or arbitrary camera poses may be available with respect to the generated space. The output of the disclosed second content generation platform may comprise a two dimensional image of the generated space and/or a three dimensional representation of the generated space based on the three-dimensional model that is generated from the point cloud.

Figure 10:
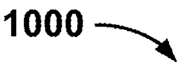
FIG. 10 is a flow diagram illustrating an embodiment of a process for generating an interactive reconstruction or floorplan of an input image.
Figure 10:
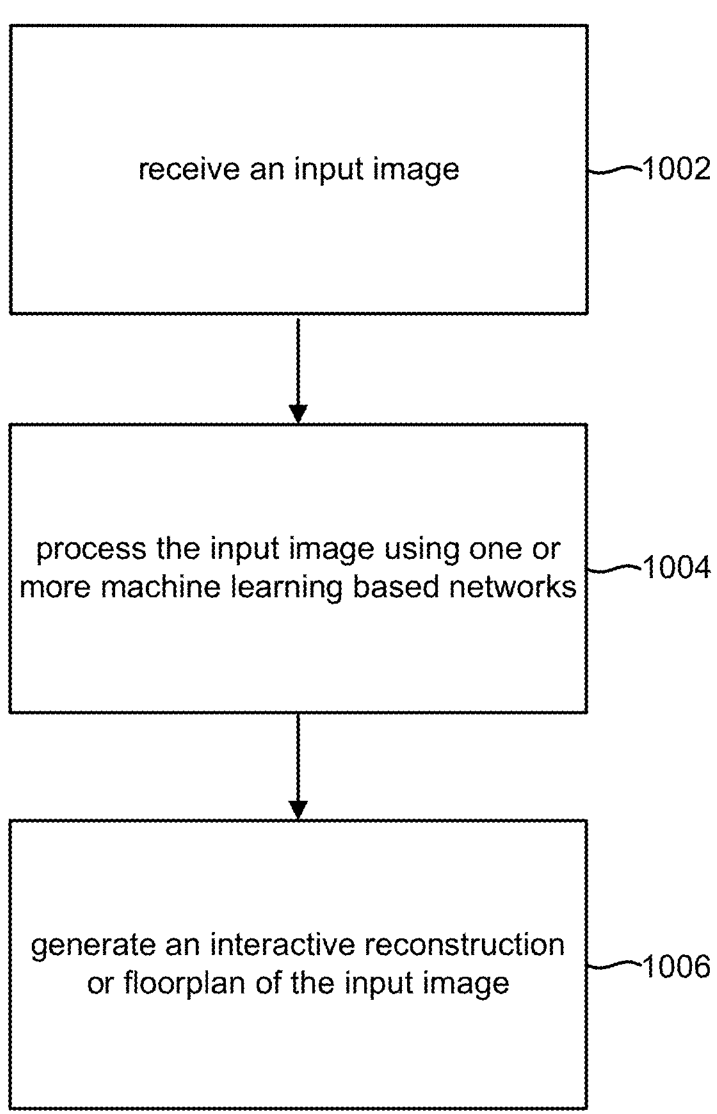

FIG. 10 is a flow diagram illustrating an embodiment of a process for generating an interactive reconstruction or floorplan of an input image. In some embodiments, process 1000 is employed by second content generation platform 900 of FIG. 9. For example, process 1000 may be employed by image processing stage 904 of second content generation platform 900 of FIG. 9. At step 1002, an input image is received. The input image comprises a scene or a space. At step 1004, the input image is processed using one or more machine learning based networks. In some cases, one or more of the machine learning based networks are trained at least in part on training images constrained to a prescribed scene type to which a scene of the input image belongs. At step 1006, an interactive reconstruction or floorplan of the input image is generated. In some cases, the generated interactive reconstruction or floorplan is used to design an associated space.

The generated space that models the input image may facilitate one or more interactive applications. For example, the surfaces of the space (e.g., floors, walls, ceilings) may be selected and changed or modified to have different desired materials or textures as well as corresponding texture orientations. The generated space corresponding to the input image may be used with respect to a room planning application, i.e., as a three-dimensional room in which objects or items or products can be placed and manipulated in a perspective correct manner and with consistent lighting. In some cases, for instance, the disclosed second content generation platform is employed with respect to a rug visualization application in which a rug is placed on a floor and under furniture with correct perspective and scale. Thus, the disclosed second content generation platform may be employed to transform any random or arbitrary input photograph or image having completely unknown and undefined characteristics directly into a floorplan that can then be interactively used to design the space, e.g., by manipulating objects in the space, modifying surface textures, changing lighting, etc. The disclosed second content generation platform pipeline includes: receiving an arbitrary input image of a space such as a room, inferring various features associated with the input image using machine learning based techniques, generating a point cloud associated with the environment or scene comprising the input image, generating a three-dimensional mesh model by fitting planes associated with surfaces in the point cloud, generating a complete or partial floorplan corresponding to the input image, identifying closest matching or other materials for surfaces in existing assets databases, generating a clean or empty space or room corresponding to the input image, and providing interactive features with respect to the generated space. One example of an interactive application comprises swapping surface materials or textures within a two-dimensional image of the generated space. Another example of an interactive application comprises operating in a three-dimensional world or environment with different objects being introduced into the generated space in a perspective correct manner and with consistent lighting effects. In some embodiments, the disclosed second content generation platform is employed to templatize, i.e., create a template for, any desired space that may then be used as a background or environment template with respect to the disclosed first content generation platform.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer program product embodied in a non-transitory computer readable medium and comprising computer instructions for:

activating one or more sets of components of an imaging studio to capture a set of images of a scene comprising the imaging studio; and providing the set of images of the scene captured in the imaging studio to an artificial intelligence based processing stage to generate an interactive image of the scene, wherein the generated interactive image of the scene comprises a two-dimensional image with at least partial three-dimensional capabilities but without having an underlying three-dimensional model and wherein the at least partial three-dimensional capabilities of the generated interactive image of the scene are facilitated by one or more machine learning based networks of the artificial intelligence based processing stage that have at least in part been trained on training images generated from corresponding three-dimensional models.

2. The computer program product of claim 1, further comprising computer instructions for guiding placement of one or more objects comprising the scene in the imaging studio.

3. The computer program product of claim 2, wherein placement of the one or more objects in the imaging studio is guided by one or more corresponding object placement templates.

4. The computer program product of claim 2, wherein guiding placement comprises providing guidelines or markers indicating placement.

5. The computer program product of claim 1, further comprising computer instructions for adjusting one or more components comprising the imaging studio.

6. The computer program product of claim 5, wherein adjusting one or more components comprising the imaging studio comprises automatically adjusting a lighting array comprising the imaging studio or a part thereof.

7. The computer program product of claim 5, wherein adjusting one or more components comprising the imaging studio comprises automatically adjusting a camera comprising the imaging studio.

8. The computer program product of claim 5, wherein adjusting one or more components comprising the imaging studio comprises automatically adjusting a turntable comprising the imaging studio.

9. The computer program product of claim 1, wherein activating one or more sets of components comprises selectively activating one or more lighting panels and one or more cameras to capture the set of images of the scene.

10. The computer program product of claim 1, wherein the set of images of the scene comprises a prescribed view of the scene.

11. The computer program product of claim 1, wherein the set of images of the scene comprises multiple and diverse views of the scene.

12. The computer program product of claim 1, wherein the set of images of the scene comprises images captured with different lighting conditions.

13. The computer program product of claim 1, wherein the set of images of the scene comprises images captured with different camera poses.

14. The computer program product of claim 1, wherein the computer program product operates as a controller of the imaging studio and components thereof.

15. The computer program product of claim 1, wherein components of the imaging studio are adjusted and activated via control signals from the computer program product.

16. The computer program product of claim 1, wherein the computer program product runs on a computing device situated outside the imaging studio.

17. The computer program product of claim 1, wherein a configurable option associated with the capture is automatically selected or user selected via a user interface.

18. The computer program product of claim 1, wherein providing the captured set of images of the scene to the artificial intelligence based processing stage comprises uploading the captured set of images of the scene to a cloud application.

19. A system, comprising:

a processor configured to:

activate one or more sets of components of an imaging studio to capture a set of images of a scene comprising the imaging studio; and provide the set of images of the scene captured in the imaging studio to an artificial intelligence based processing stage to generate an interactive image of the scene, wherein the generated interactive image of the scene comprises a two-dimensional image with at least partial three-dimensional capabilities but without having an underlying three-dimensional model and wherein the at least partial three-dimensional capabilities of the generated interactive image of the scene are facilitated by one or more machine learning based networks of the artificial intelligence based processing stage that have at least in part been trained on training images generated from corresponding three-dimensional models; and a memory coupled to the processor and configured to provide the processor with instructions.

20. A method, comprising:

activating one or more sets of components of an imaging studio to capture a set of images of a scene comprising the imaging studio; and providing the set of images of the scene captured in the imaging studio to an artificial intelligence based processing stage to generate an interactive image of the scene, wherein the generated interactive image of the scene comprises a two-dimensional image with at least partial three-dimensional capabilities but without having an underlying three-dimensional model and wherein the at least partial three-dimensional capabilities of the generated interactive image of the scene are facilitated by one or more machine learning based networks of the artificial intelligence based processing stage that have at least in part been trained on training images generated from corresponding three-dimensional models.

21. The system of claim 19, wherein the processor is further configured to guide placement of one or more objects comprising the scene in the imaging studio.

22. The system of claim 21, wherein placement of the one or more objects in the imaging studio is guided by one or more corresponding object placement templates.

23. The system of claim 21, wherein to guide placement comprises to provide guidelines or markers indicating placement.

24. The system of claim 19, wherein the processor is further configured to adjust one or more components comprising the imaging studio.

25. The system of claim 24, wherein to adjust one or more components comprising the imaging studio comprises to automatically adjust a lighting array comprising the imaging studio or a part thereof.

26. The system of claim 24, wherein to adjust one or more components comprising the imaging studio comprises to automatically adjust a camera comprising the imaging studio.

27. The system of claim 24, wherein to adjust one or more components comprising the imaging studio comprises to automatically adjust a turntable comprising the imaging studio.

28. The system of claim 19, wherein to activate one or more sets of components comprises to selectively activate one or more lighting panels and one or more cameras to capture the set of images of the scene.

29. The system of claim 19, wherein the set of images of the scene comprises a prescribed view of the scene.

30. The system of claim 19, wherein the set of images of the scene comprises multiple and diverse views of the scene.

31. The system of claim 19, wherein the set of images of the scene comprises images captured with different lighting conditions.

32. The system of claim 19, wherein the set of images of the scene comprises images captured with different camera poses.

33. The system of claim 19, wherein the system operates as a controller of the imaging studio and components thereof.

34. The system of claim 19, wherein components of the imaging studio are adjusted and activated via control signals from the system.

35. The system of claim 19, wherein the system is situated outside the imaging studio.

36. The system of claim 19, wherein a configurable option associated with the capture is automatically selected or user selected via a user interface.

37. The system of claim 19, wherein to provide the captured set of images of the scene to the artificial intelligence based processing stage comprises to upload the captured set of images of the scene to a cloud application.

38. The method of claim 20, further comprising guiding placement of one or more objects comprising the scene in the imaging studio.

39. The method of claim 38, wherein placement of the one or more objects in the imaging studio is guided by one or more corresponding object placement templates.

40. The method of claim 38, wherein guiding placement comprises providing guidelines or markers indicating placement.

41. The method of claim 20, further comprising adjusting one or more components comprising the imaging studio.

42. The method of claim 41, wherein adjusting one or more components comprising the imaging studio comprises automatically adjusting a lighting array comprising the imaging studio or a part thereof.

43. The method of claim 41, wherein adjusting one or more components comprising the imaging studio comprises automatically adjusting a camera comprising the imaging studio.

44. The method of claim 41, wherein adjusting one or more components comprising the imaging studio comprises automatically adjusting a turntable comprising the imaging studio.

45. The method of claim 20, wherein activating one or more sets of components comprises selectively activating one or more lighting panels and one or more cameras to capture the set of images of the scene.

46. The method of claim 20, wherein the set of images of the scene comprises a prescribed view of the scene.

47. The method of claim 20, wherein the set of images of the scene comprises multiple and diverse views of the scene.

48. The method of claim 20, wherein the set of images of the scene comprises images captured with different lighting conditions.

49. The method of claim 20, wherein the set of images of the scene comprises images captured with different camera poses.

50. The method of claim 20, wherein the method is used by a controller of the imaging studio and components thereof.

51. The method of claim 20, wherein components of the imaging studio are adjusted and activated via control signals from a controller.

52. The method of claim 20, wherein the method is used by a controller situated outside the imaging studio.

53. The method of claim 20, wherein a configurable option associated with the capture is automatically selected or user selected via a user interface.

54. The method of claim 20, wherein providing the captured set of images of the scene to the artificial intelligence based processing stage comprises uploading the captured set of images of the scene to a cloud application.

* * * * *